July 17, 1962    A. G. BLOSS    3,044,368
WHEEL TRUING APPARATUS FOR RAILROAD VEHICLES
Filed April 28, 1958    4 Sheets-Sheet 1
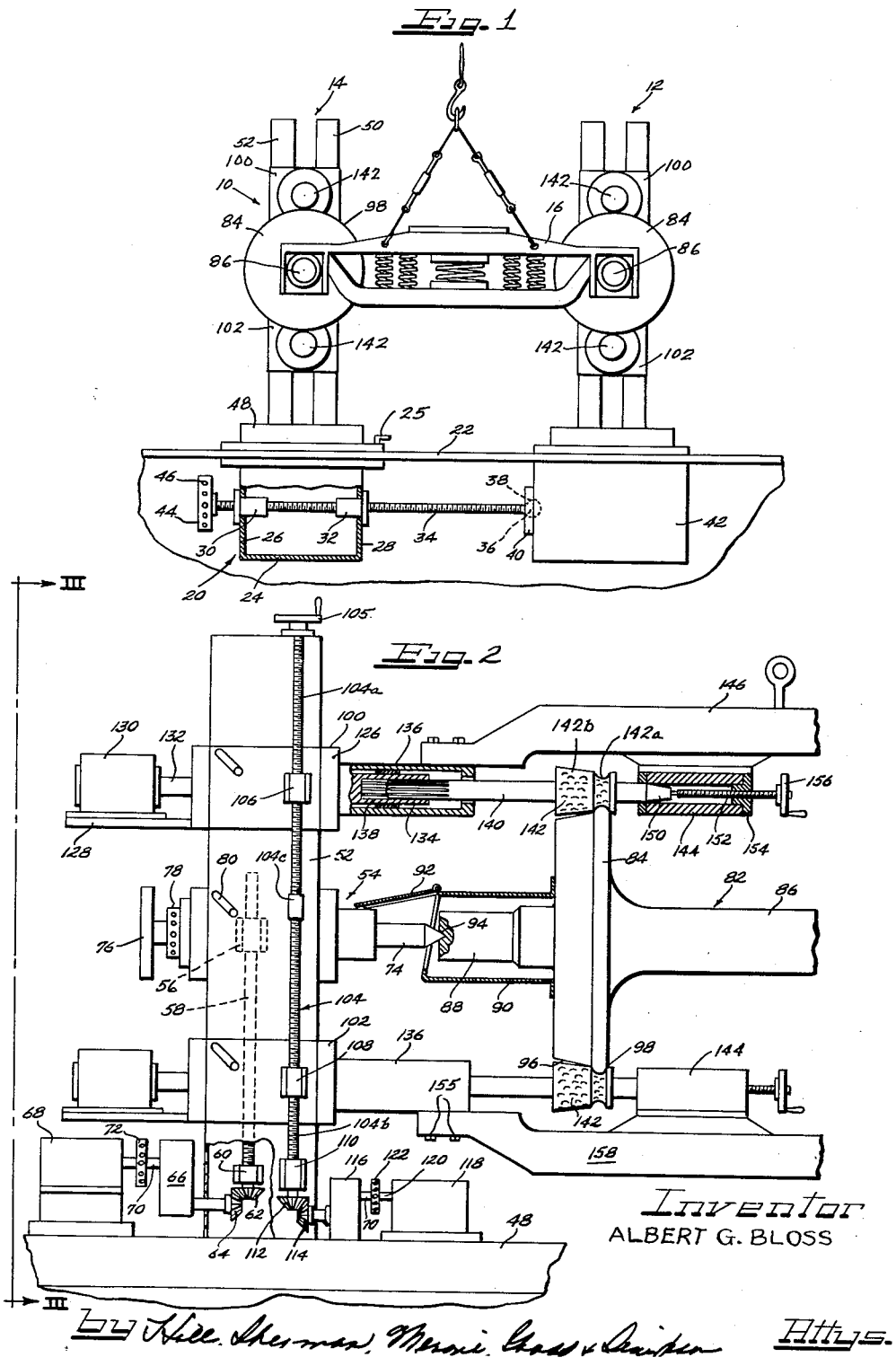
Inventor
ALBERT G. BLOSS July 17, 1962 A. G. BLOSS 3,044,368
WHEEL TRUING APPARATUS FOR RAILROAD VEHICLES
Filed April 28, 1958 4 Sheets-Sheet 2

Inventor
ALBERT G. BLOSS
by Hill, Sherman, Meroni, Gross & Simpson Attys.

July 17, 1962    A. G. BLOSS    3,044,368
WHEEL TRUING APPARATUS FOR RAILROAD VEHICLES
Filed April 28, 1958                4 Sheets-Sheet 3
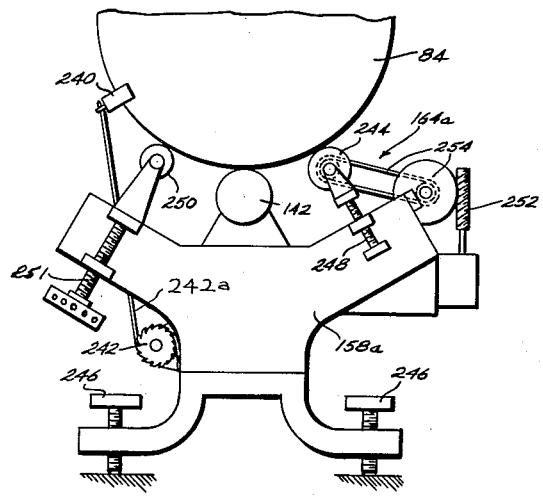
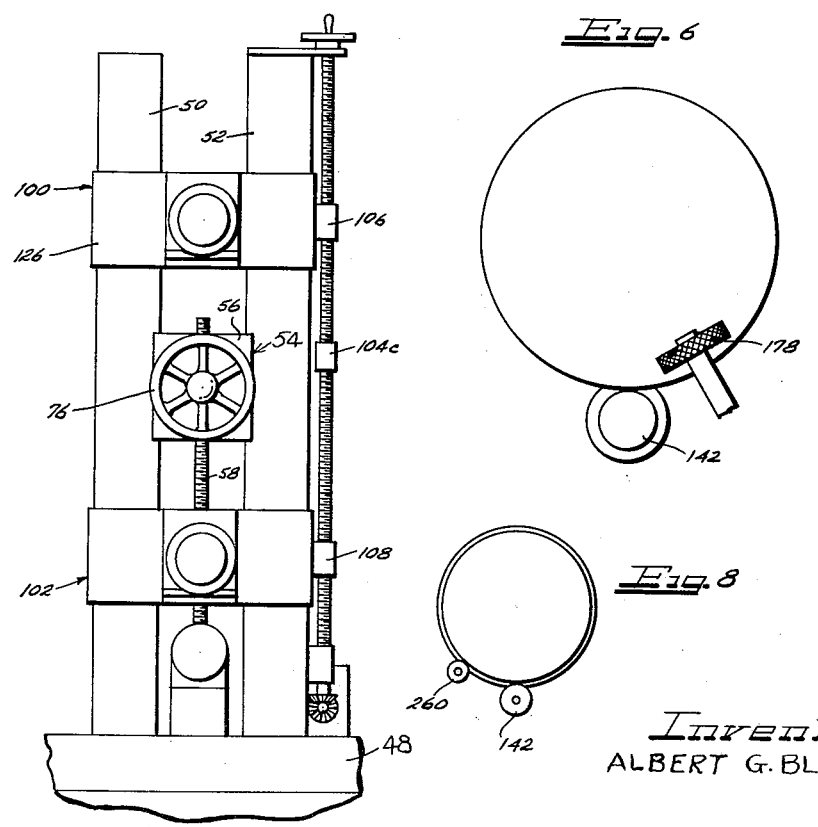
Inventor
ALBERT G. BLOSS Inventor
ALBERT G. BLOSS

United States Patent Office 3,044,368
Patented July 17, 1962

3,044,368
WHEEL TRUING APPARATUS FOR RAILROAD VEHICLES
Albert G. Bloss, 322 8th Ave., Huntington, W. Va.
Filed Apr. 28, 1958, Ser. No. 731,478
6 Claims. (Cl. 90—16)

This invention relates to apparatus for truing wheel treads of locomotives, passenger cars, box cars and the like, and more particularly to apparatus for truing wheel treads of the stated type in which the wheels of a wheel assembly or of an entire truck unit may be trued accurately during only a partial revolution thereof. This invention is an improvement over the invention described and claimed in my Patent Number 2,677,307 entitled "Apparatus and Method For Truing Wheel Treads of Railroad Vehicles."

In particular, the present invention contemplates the provision of means for truing wheels of the type utilized in railroad vehicles in which an entire truck unit may be held in a predetermined position and one or more cutter heads may be moved into engagement with each of the wheels of the unit for simultaneously truing the treads and flanges of each wheel after but a partial revolution of the wheels.

According to the present invention also, convenient means are also provided for rotating the several wheels of a truck unit or wheel assembly through a predetermined arc at a required cutting speed with a high degree of accuracy.

Another feature of the present invention is the provision of truing apparatus which is capable of truing multiple wheels of a railroad vehicle truck simultaneously, and which may be partially disassembled for truing the wheels of a locomotive or the like without the need for removing the truck from the vehicle.

A principal object of the invention is, therefore, to provide apparatus for truing the wheels of railroad vehicles efficiently and effectively with maximum efficiency and economy.

A more particular object of the invention is to provide wheel truing apparatus of the stated type including stationary standards having means for centering the axles of a wheel assembly of a railroad vehicle truck and radially adjustable milling means positionable in circumferentially spaced relation about the peripheries of the several wheels of an assembly, and horizontally adjustable upright standards similarly provided with centering means and cutting means so that multiple wheels of a truck may be simultaneously trued.

With the above important objects and features in view and such other objects and features as may become apparent as this specification proceeds, the invention consists essentially of the arrangement and construction of parts as illustrated in the accompanying drawings, in which:

FIGURE 1 is an elevational view showing a stationary standard and a horizontally adjustable standard constituting half of the truing apparatus of the present invention, and showing a vehicle truck in truing position;

FIGURE 2 is an elevational view of the truing apparatus of FIGURE 1 showing the left half of the apparatus, and is taken as viewed from the left in that figure;

FIGURE 3 is an elevational view taken substantially on line III—III of FIGURE 2;

FIGURE 6 is a diagrammatic view showing a preferred angular relation between the wheel driving means and the lowermost milling head;

FIGURE 7 is a fragmentary elevational view of a modified form of the present invention;

FIGURE 8 is a fragmentary elevational view of another modified form of the present invention;

Figure 4:
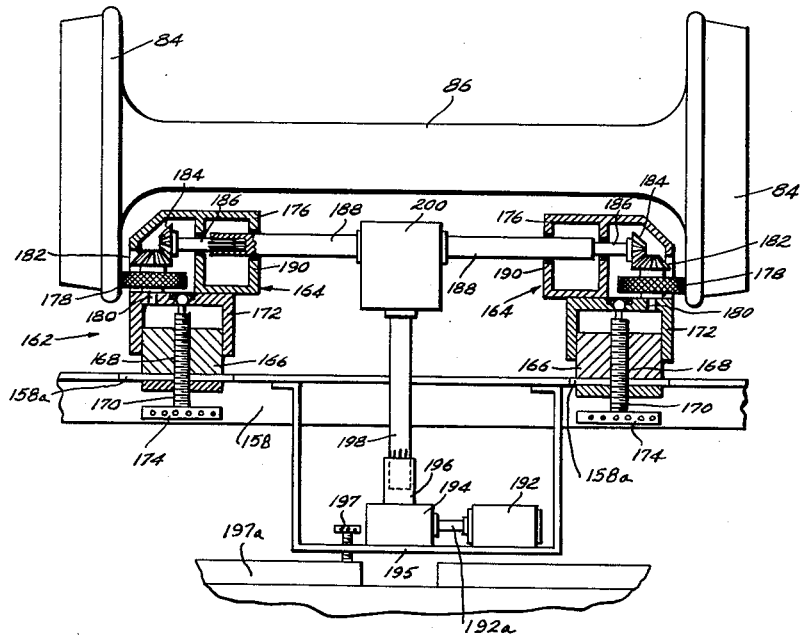
FIGURE 4 is an elevational diagrammatic view of the wheel rotating mechanism of the present invention, certain elements of the cutter assemblies being removed for the sake of clarity.

Referring now to the drawings, and more particularly to FIG. 1, there is shown in that figure, somewhat diagrammatically, half of the truing apparatus of the present invention, which is indicated generally by reference numeral 10. The apparatus 10 includes a first pair of laterally spaced upright standards or colums 12 (only one of which is shown in this figure) which are stationary, and a second pair of laterally spaced, upright, horizontally adjustable columns or standards 14 (only one of which is shown). Although the present invention is described as used on a truck with two pairs of wheels, it will be understood that the machine could embody three pairs of standards 12, 14 to facilitate handling of trucks having three pairs of wheels. A railroad vehicle trucks, indicated by reference numeral 16 may be supported between the several standards 12 and 14 by any suitable means such as hook 18 of an overhead crane (not shown). The distance between the standards 14 and the standards 12 may be adjusted to compensate for variations in wheel bases of the trucks by an adjusting mechanism indicated generally at 20 and having a trackway or guide 22 which affords support and sliding movement of the standards 14 towards and away from the standards 12. The adjusting assembly 20 includes a housing 24 having spaced walls 26 and 28 in which are mounted internally threaded bosses 30 and 32 for threaded reception of an elongated screw 34 having at one end a ball head 36 received in a correspondingly formed socket 38 formed in a plate 40 secured to a stationary bed plate 42. At the other end of the screw 34 is a capstan 44 having circumferentially spaced openings 46 in which may be inserted a suitable tool (not shown) for facilitating rotation. The standard 14 has a lock 25 cooperable with the trackway or guide 22 to lock the movable standard 14 in adjusted position.

Referring now to FIGURE 2, there is shown fragmentarily in this figure, in elevation, one of the standards 14 of FIGURE 1, it being understood that the standards are identical, with the sole exception that the standards 14 are horizontally adjustable with respect to the standards 12. Each standard includes a base plate 48 to which is secured spaced parallel posts 50 and 52. Slidably mounted on the posts 50 and 52 is a centering unit 54. The unit 54 has a bracket 56 internally threaded for reception of an elongated screw 58 which is journalled in a bearing 60 and is connected at its lower end to a bevel gear 62. The bevel gear 62 is meshed with a complementary bevel gear 64 rotatably connected to a speed reducing unit 66, which is driven by an electric motor 68 through the medium of a shaft 70 on which is mounted a capstan 72 for manual rotation of the screw 58, if required. Forming a part of centering unit 54 is an axially extensible tail stock 74 which may be moved horizontally by rotation of a wheel 76. Locks 78 and 80 are provided to secure the tail stock 74 in any selected position.

A wheel assembly 82, which may form a part of the truck 16 shown in FIGURE 1 includes spaced flange wheels 84 rigidly connected by means of an axle 86. Extending outwardly from the wheel 84 is a journal 88 illustrated as enclosed within a journal box 90 having a pivotal lid 92. At the outer end of the journal 88 is an axially aligned conical recess 94 in which is received the pointed end of the tail stock 74. Thus it will be seen that a wheel assembly comprising two wheels, or an entire vehicle truck may be maintained in a pre-selected position by the tail stocks 74 forming parts of the several standards or columns of the truing apparatus of the present invention.

According to the present invention, a plurality of cutter assemblies are provided which are movable in unison for a predetermined distance into the periphery of tread 96 and flange 98 of each of the wheels 84. In the present embodiment, a pair of vertically adjustable cutter assemblies 100 and 102 are slidably mounted on the posts 50 and 52 and may be moved in unison towards and away from a center line defined by the tail stock 74 by means of an elongated screw 104 which is threadedly received in correspondingly threaded brackets 106 and 108 secured to the cutter assemblies 100 and 102 respectively. The screw 104 is journalled in a bearing 110 and is connected at its lower end to a bevel gear 112 which is meshed with a complementary pinion gear 114 operatively connected to a reduction gear unit 116 which may be driven by an electric motor 118 through the medium of a shaft 120. A capstan 122 is mounted on the shaft 120 for manual operation of the screw 104, if required. The capstans 72 and 122 are manually adjusted to effect delicate adjustments in reference to the height of centers and the depth of cut and it will be understood that the opposite sides of the machine are synchronized for unison adjustment, one with the other. Desirably, the motors 68 and 118 are synchronized so that the cutter assemblies 100 and 102 may be moved toward the wheel 84 a predetermined distance at any preselected position of the centering unit 54. To effect this result, the screw 104 has oppositely threaded upper and lower sections 104a and 104b, respectively, joined by a splined coupling 104c. Alternately, the adjustment of the cutter assemblies 100 and 102 with respect to the axis of the tail stock 74 may be effected manually by operating the capstan 122 or a hand wheel 105, connected to the section 104a. The coupling 104c may be disconnected for separate operation of the sections 104a and 104b.

Each of the cutter assemblies 100 and 102 are identical, and for the sake of convenience only the cutter assembly 100 will now be described in detail. The cutter assembly 100 includes a frame 126 shaped generally to conform to the configuration of the posts 50 and 52. Extending outwardly from one side of the frame 126 is a mounting plate 128 for supporting an electric motor 130 which is connected by a shaft 132 to a splined joint 134 enclosed within a housing 136. The joint 134 includes an internally splined sleeve 138 for sliding reception of an externally splined shaft 140 at the outer end of which is mounted a full contour milling head 142, having a flange cutting portion 142a and a tread cutting portion 142b. To line the wheel 84 with the cutter, the wheel 76 is adjusted and locking is effected by the wheel 78.

Axial adjustment of the milling head 142 is afforded by an adjusting unit 144 removably mounted by suitable fastening means on a top rail 146 which is secured to the housing 136 and extends across to the corresponding housing 136 of the upper cutting assembly of the opposite standard or column 14. Whenever it is desired to replace the milling head 142, the unit 144 is temporarily removed. The unit 144 is shown in cross-section in FIGURE 2 and is shown as journalling a tapered shank 150 of a stock. The outer end of the stock is centered against an adjusting screw 152 journalled in an end plate 154 and rotated in one direction or the other by a hand wheel 156 for movement of the head 142 to the left or the right, as viewed in FIGURE 2. The unit 144 for the cutting assembly 102 is mounted on a crossrail 158, which in turn is secured to the adjacent housing 136 by fasteners as at 155, and at the other end thereof to the corresponding housing of the lower cutter assembly of the other standard 14.

By arranging a slip sleeve coupling on the housing 136 for coupling with the frame 126 by cap screws, a quick change is available to remove the top rail 146 in order to machine wheels under the vehicle. Thus, it is possible to clear the car body and the frame 126 remains undisturbed on the column.

Referring now to FIGURE 4, there is shown power means for rotating the wheels of a wheel assembly, or vehicle wheels mounted for rotation on a fixed shaft. The illustrated embodiment of FIGURE 4 exemplifies the structure and operation of the components but it will be understood that to give all clearance possible, for example, on locomotive wheels, the structure herein described could be inverted by inverting the knurled drive roll 178 with relation to the gear 184, thereby lowering the drive mechanism. It will be understood that a power unit, indicated generally by reference numeral 162, is provided for each pair of opposed standards so that four wheels may be trued simultaneously. The unit 162 includes a pair of spaced transmission assemblies 164, 164 slidably mounted on the cross rail 158. For this purpose the cross rail 158 may be appropriately sloted as at 158a. Each of the assemblies 164 includes a base 166 having a threaded central opening 168 for reception of an elongated screw 170 the upper end of which abuts against a cap 172, and the lower end of which is provided with a capstan 174. Atop the cap 172 is a gear box 176 from which protrudes a knurled friction wheel 178 for engaging the outer marginal edge of the inner surface of an adjacent wheel 84. The friction wheel 178 is rotatably mounted on a shaft 180 to which is secured a bevel gear 182 meshing with a complementary bevel gear 184 which is operatively connected to an externally splined shaft 186 receivable in an internally splined tube 188 journalled in an end wall 190 of the gear box 176.

To drive the friction wheel 178 there is provided an electric motor 192 having a power take-off shaft 192a connected through a gear reduction box 194 to an internally splined tube 196, an externally splined shaft 198, and a suitable gear box 200. The assembly 164 on the right-hand side of FIGURE 4 is connected to a splined tube 188 and is similarly actuated. The motor 192 and the reduction box 194 are mounted on a bracket 195 secured to the undersurface of the crossrail 158. A screw 197 may be employed to rigidify the bracket 195 against a solid base as at 197a thereby to minimize chattering while the truing apparatus is in operation. Operation of the capstan 174 for the rotation of the screw 170 affords adjustment of the friction wheel 178 to accommodate vehicle wheels of different diameters.

Figure 5:
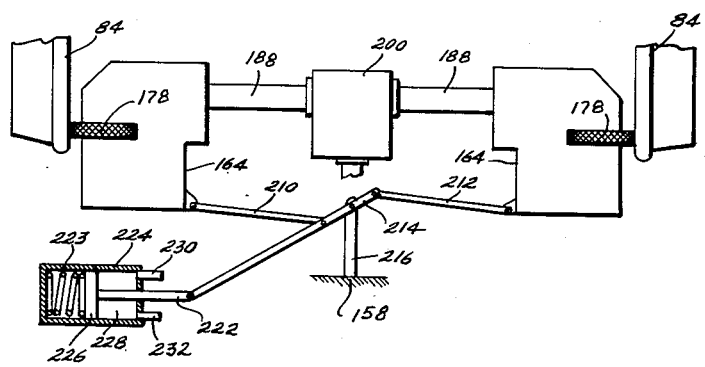
FIGURE 5 is a diagrammatic view of one means for axially adjusting the wheel rotating means.

According to the present invention, means are provided for moving the several assemblies 164 axially for selective engagement and disengagement of the friction wheels 178 with the vehicle wheels. Any suitable means may be employed to afford this axial adjustment. In FIGURE 5, there is shown somewhat diagrammatically one means for affording axial adjustment quickly and effectively. A pair of links, 210 and 212, are connected at their outer ends to the several assemblies 164, and at their inner ends to a link 214 which is pivotally mounted to a fixed standard 216. The standard 216 may be mounted on the crossrail 158. To one end of the link 214 is connected at 220 a shaft 222 forming a part of a fluid cylinder 224. The cylinder 224 includes a plunger 226 connected to the shaft 222 and urged to the right, as viewed in that figure, in opposition to fluid pressure within the chamber 228 by a compression spring 223. Ports 230 and 232 are provided for the introduction and discharge of pressure fluid, respectively. In the position illustrated, the several friction wheels 178 are shown as being in engagement with the inner surfaces of the wheels 84 and the compression spring 223 is compressed. When disengagement is desired, fluid is exhausted from the chamber 228, the shaft 222 moves to the right thus pivoting the links 212 and 214 in a counterclockwise direction, and the assemblies 164 are drawn towards the reduction gear 200. The spline couplings between the reduction gear 200 and the assemblies 164 permit such a movement. Likewise, the splined coupling comprising the tube 196 and the shaft 198 affords substantially vertical adjustment of the several assemblies 164.

Referring now to FIGURE 6, each of the assemblies 164 is desirably disposed at an angle to the vertical to permit movement of the milling heads 142 through a path of cutting movement with respect to an associated wheel 84.

In FIGURE 7 a wheel 84 may be positioned on tail stocks 74 as in the principal form of the invention. In this form of the invention as well as that shown in FIGURE 1 cut rails (not shown) may be employed to bring a truck, wheel assembly or an entire railway vehicle into position. The cut rails may be mounted on a trestle to obviate the need for a pit. The wheels are then lifted so that they clear the cut rails. A bottom rail 158a is then raised by any suitable means until the cutters 142 approach the desired depth of cut. Then a clamp 240 is applied to the marginal edges of the wheel. The clamp 240 is connected to a winch 242 by a cable 242a. Upon actuation of the winch 242 the wheel is rotated until a trued portion reaches a drive wheel 244 forming a part of an alternate driving mechanism 164a. The drive wheel 244, unlike the drive wheel 74, rides on the tread of the wheel 84. When a trued portion of the tread reaches the drive wheel 244, the clamp 240 is removed. Jackscrews 246 in the crossrail 158a are then lowered to a fixed surface and the wheel is rotated by the drive wheel 244 which is moved into engagement with the wheel by a jackscrew 248. The drive wheel is preferably rotated without slippage by any suitable driving transmission and as illustrated herein a worm gear 252 drives through a transmission 254. An idler roller 250 may be selectively urged into engagement with the wheel by a jackscrew 251. By the arrangement of the form of the invention shown in this figure a drive wheel, such as wheel 244, may be utilized to engage the tread of the wheel 84 directly. The clamp 240 assures uniformity of rotation of the wheel despite irregularities that might exist on the tread surface. It will be appreciated that in this form of the invention the wheel 84 is rotated a full revolution.

In FIGURE 8 is shown a further modified form of the invention in which the milling head 142 is positioned at the bottom of the wheel and in which a roughing cutter 260 is arranged in circumferentially spaced relation thereto. This arrangement is particularly useful for truing the wheels of diesel locomotives. The roughing cutter 260 leaves only a minimum amount of metal to be removed by the cutter 142. Truing may be effected with but one revolution of the wheel.

By the use of the above described invention, great financial savings may be afforded since the need for the conventional pit is obviated. Since each of the milling heads 142 traverses a portion of the periphery of each wheel, wear on the heads is minimized and the time intervals between replacements are extended. Moreover, by the present apparatus a wheel may be trued in half the time required by conventional apparatus in which a wheel is rotated through a full revolution. In operation, the wheel assembly or truck is supported firmly at each end so that the apparatus is rigid in operation and thus maintenance costs are reduced. This is in contrast to conventional apparatus using a U-shaped casting with an open top.

Figure 9:
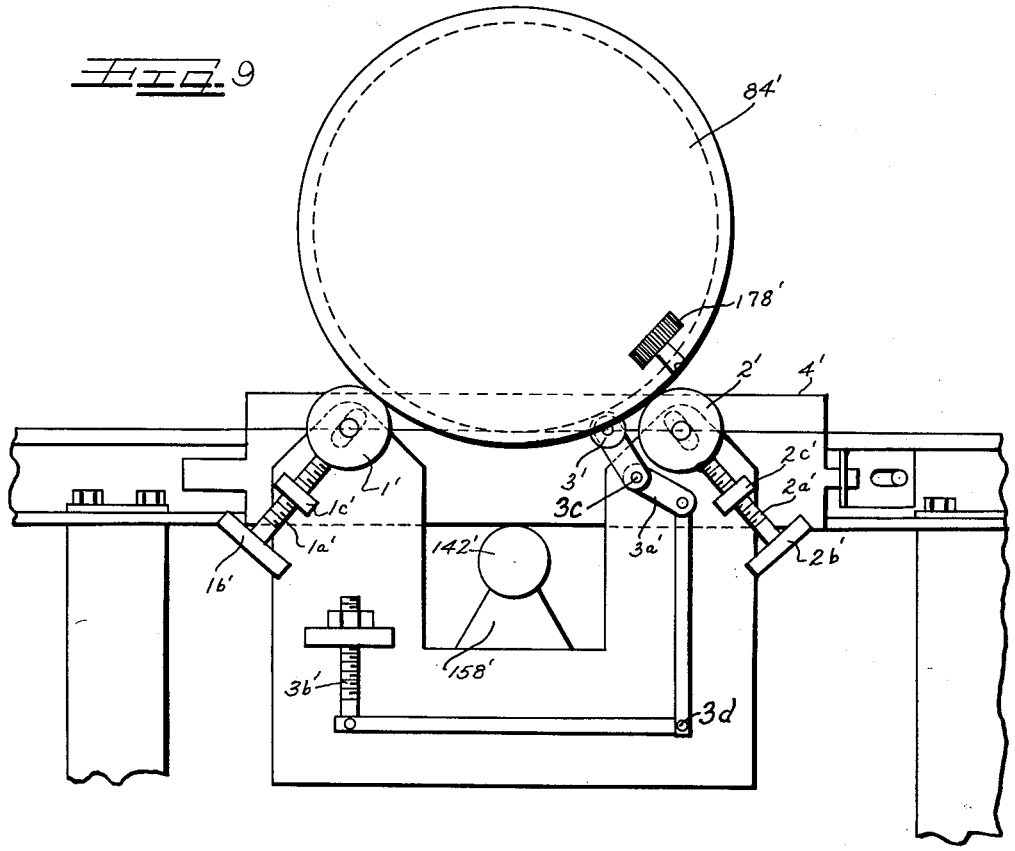
FIGURE 9 is a view similar to FIGURE 7 showing an arrangement of drive and support rolls for truing wheels under the vehicle to relieve some of the weight from the support centers.
Figure 10:
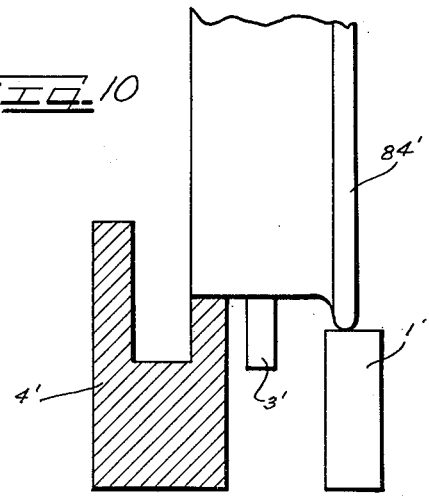
FIGURE 10 is a somewhat diagrammatic fragmentary cross-sectional view showing the arrangement of parts relative to the wheel in the structure of FIGURE 9.

In FIGURES 9 and 10, a drive and support arrangement is shown which is similar to that illustrated in FIGURE 7, but wherein means relieve some of the weight from the support centers. Like numerals are employed to describe like elements wherever possible for the sake of clarity.

A vehicle having a set of wheels, one of which is indicated at 84′ to be re-machined or trued without the removal of the vehicle wheel trucks is moved into position on a so-called cut rail 4′ superjacent a cutter 142′ mounted on a casting 158′, as previously described.

A pair of spaced support rolls 1′ and 2′ are carried on adjusting screws 1a′ and 2a′ having actuating means 1b′ and 2b′ attached thereto for threadedly adjusting the screws 1a′ and 2a′ through support means 1c′ and 2c′, respectively, thereby adjusting the support rolls 1′ and 2′ towards and away from the corresponding wheel 84′.

When inactive, the support rolls 1′ and 2′ are below the surface of the cut rail 4′, thereby to permit the vehicle to roll into place. Then the support rolls 1′ and 2′ are forced against the outside diameter of the flanges on the wheel, as is more clearly indicated in the diagrammatic cross-sectional view of FIGURE 10. By so proceeding, the weight on the cut rail 4′ is relieved, whereupon the cut rail is removed and the tailstock centers such as 74, as previously described, are then adjusted to the vehicle wheels on each side of the device.

The outside diameter of the wheel flange has little variation from the original diameter with relation to the center of the vehicle wheel because the peripheral surface of the flange is not subjected to undue wear. Accordingly, by utilizing the support rolls 1′ and 2′ in engagement with the peripheral surface of the flange, there is provided a starting point which is relatively true with respect to the center of the wheel to establish a machined surface on the main portion of the wheel.

As previously described, a drive roll 178′ engages the inside surface of the wheel rim to rotatably drive the wheel at proper cutting speed. The cutter is moved into active engagement with the peripheral surface of the wheel and the cutting operation is begun. As soon as the surface is partially machined, a supplemental support roll 3′ is actuated into supporting engagement with the wheel at the machined surface portion thereof. The supplemental support wheel 3′ is carried by a leverage system indicated at 3a′. Screw adjustment means for the leverage system 3a′ are indicated at 3b′. The pivot points indicated at 3c and 3d are provided by fixed pivot pads to permit inward and outward movement of the supplemental support wheel 3′.

There is thus provided a support for the wheel on the machine surface which is true center and ready for rotation to produce a complete revolution of the wheel for a finish cut. After completion of the truing operation, the support rolls 1′ and 2′ are reapplied, and the supplemental support roll 3 is released, whereupon the cut rail 4′ is reapplied in position and the wheels lowered thereonto. It will be understood, of course, that all of the adjustment means described herein can be completely motorized for power-driven operation under the usual controls, if desired.

Although various minor modifications might be suggested by those versed in the art, it should be understood that I wish to embody within the scope of the patent warranted hereon all such modifications as reasonably and properly come within the scope of my contribution to the art.

I claim as my invention:

1. Apparatus for simultaneously truing the treads and flanges of the wheels of a railway truck having pairs of spaced flanged wheels rigidly connected by spaced axles comprising a pair of fixed spaced standards, a second pair of standards movable horizontally with respect to said first pair of standards, each of said standards having a vertically movable centering means including a tailstock, said tailstocks being adapted to maintain said wheels in a predetermined position, each of said standards including a pair of vertically spaced cutter assemblies, means for moving said cutter assemblies in unison towards and away from said tailstocks, each of said cutter assemblies having a full contour milling head rotatably mounted thereon, means including an electric motor for rotating each of said milling heads at milling speed, means for rotating said wheels at milling feed speed, whereby said milling heads may be brought into engagement with said wheels for truing the same upon one-half revolution thereof.

2. Apparatus for simultaneously truing the treads and flanges of the wheels of a railway truck having pairs of spaced flanged wheels rigidly connected by spaced axles comprising a pair of fixed spaced standards, a second pair of standards movable horizontally with respect to said first pair of standards, each of said standards having a vertically movable centering means including a tailstock, means including an elongated screw for moving said centering means, a lock for retaining said centering means in a predetermined position, said tailstocks being adapted to maintain said wheels in a predetermined position, each of said standards including a pair of vertically spaced cutter assemblies, each of said cutter assemblies having a full contour milling head rotatably mounted thereon, means including a splined shaft affording axial adjustment of each of said milling heads, means for moving said cutter assemblies in unison towards and away from said tailstocks to adjust to a common cutting depth whereby said milling heads may be brought into engagement with said wheels for truing the same upon one-half revolution thereof.

3. Apparatus for truing the wheels of a wheel assembly of a railway vehicle, said wheel assembly including a pair of spaced flanged wheels joined by an integral axle, comprising a pair of spaced standards, each of said standards having a centering means including a tailstock for maintaining said assembly in a predetermined position, each centering means being slidably mounted on its associated standard, means including an elongated screw and a handwheel for vertically adjusting said centering means, a lock for securing each of said centering means in a predetermined position, a pair of cutting assemblies slidably mounted on each standard, each of said cutting assemblies including an electric motor, a shaft, a full contour milling head rotatably mounted on said shaft, means affording axial adjustment of each of said milling heads, means including an elongated screw for affording vertical adjustment of said cutter assemblies so that each pair of cutting assemblies on said standard moves in unison towards the periphery of a wheel to adjust to a common cutting depth, said screw being formed in two sections having oppositely directed threads, means including a jackscrew for steadying the workpiece to prevent chatter and means including axially extensible friction wheels selectively engageable with the inner surfaces of said wheels for rotating same, whereby each wheel of an assembly may be trued with one half revolution thereof.

4. Apparatus for truing the wheels of a wheel assembly of a railway vehicle, said wheel assembly including a pair of spaced flanged wheels joined by an integral axle, comprising a pair of spaced standards, each of said standards having a centering means including a tailstock for maintaining said assembly in a predetermined position, each centering means being slidably mounted on its associated standard, means including an elongated screw and a handwheel for vertically adjusting said centering means, a lock for securing each of said centering means in a predetermined position, a pair of milling cutting assemblies slidably mounted on each standard, each of said cutting assemblies including an electric motor, a shaft, a full contour milling head rotatably mounted on said shaft, means for affording axial adjustment of each of said milling heads, means including an elongated screw for affording vertical adjustment of said cutter assemblies so that each assembly of a pair moves in unison into engagement with the adjacent wheel for common adjustment to proper cutting depth and, means for rotating said wheel assembly at milling feed speed including an electric motor and a pair of axially extensible friction wheels selectively engageable with the wheels of a wheel assembly.

5. Apparatus for simultaneously truing the treads and flanges of the wheels of a railway truck having pairs of spaced flanged wheels rigidly connected by spaced axles comprising a first centering means, means to move said first centering means horizontally, a second centering means, means for moving said second centering means vertically, both pairs of spaced flanged wheels being centered upon moving said first and second centering means, plural cutter assemblies each comprising a full contour milling cutter movably mounted and movable in unison towards and away from the centering means for engagement with the treads and flanges of the wheels, and driving means rotatably driving the cutter assemblies and the wheels at milling feed speed to true all the wheels simultaneously upon one-half revolution thereof.

6. Apparatus for truing the wheels of a wheel assembly of a railway vehicle, said wheel assembly including a pair of spaced flanged wheels joined by an integral axle, comprising a pair of spaced standards, each of said standards having a centering means including a tailstock for maintaining said assembly in a predetermined position, each centering means being slidably mounted on its associated standard, means including an elongated screw and a hand wheel for vertically adjusting said centering means, a lock for securing each of said centering means in a predetermined position, a pair of milling cutting assemblies slidably mounted on each standard, each of said cutting assemblies including an electric motor, a shaft, a full contour milling head rotatably mounted on said shaft, means for affording axial adjustment of each of said milling heads, means including an elongated screw for affording vertical adjustment of said cutter assemblies so that each assembly of a pair moves in unison into engagement with the adjacent wheel for common adjustment to proper cutting depth and means for rotating said wheel assembly at milling feed speed, whereby each wheel of the assembly may be trued with one-half revolution thereof.

References Cited in the file of this patent

UNITED STATES PATENTS

| | | |
|---|---|---|
| 303,609 | Barclay | Aug. 19, 1884 |
| 1,698,637 | Kessler | Jan. 8, 1929 |
| 1,805,188 | Roberts et al. | May 12, 1931 |
| 2,008,083 | Muller | July 16, 1935 |
| 2,213,251 | Lundberg et al. | Sept. 3, 1940 |
| 2,605,591 | Hill | Aug. 5, 1952 |
| 2,612,809 | Shager | Oct. 7, 1952 |
| 2,622,374 | Stanley | Dec. 23, 1952 |
| 2,630,026 | Monson | Mar. 3, 1953 |
| 2,677,307 | Bloss | May 4, 1954 |
| 2,791,921 | Heppenstall et al. | May 14, 1957 |
| 2,882,013 | Margetts et al. | Apr. 14, 1959 |

FOREIGN PATENTS

| | | |
|---|---|---|
| 16,524 | Great Britain | 1887 |
| 47,096 | Norway | Oct. 21, 1929 |
| 504,285 | Italy | Dec. 10, 1954 |